Feb. 16, 1943.  R. J. VEDOVELL  2,311,494
SEAL
Filed Nov. 28, 1940
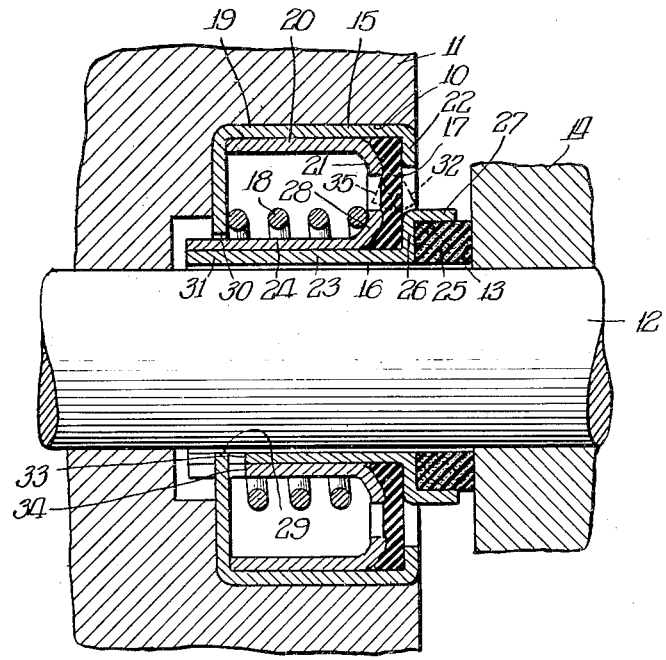
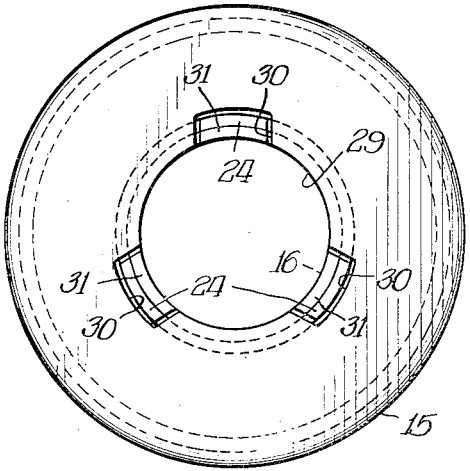
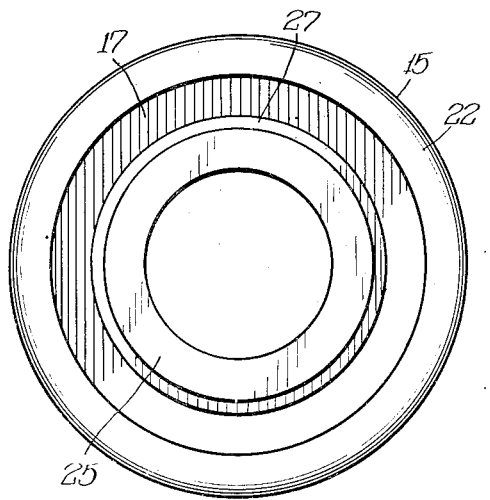
INVENTOR.
Rudolph J Vedovell,
BY Cromwell, Greist + Warden
Attys Patented Feb. 16, 1943

2,311,494

UNITED STATES PATENT OFFICE 2,311,494

SEAL

Rudolph J. Vedovell, Kenilworth, Ill., assignor to Chicago Rawhide Manufacturing Company, Chicago, Ill., a corporation of Illinois Application November 28, 1940, Serial No. 367,604

6 Claims. (Cl. 286—11)

The present invention has to do with oil seals of the end-thrust type, in which the sealing portion is pressed axially into resiliently yieldable engagement with a relatively rotatable portion of some associated machine part.

The principal object of the invention is to provide an improved seal of the character described which is simple in construction, inexpensive to manufacture, and efficient in operation.

While the foregoing statements are indicative in a general way of the nature of the invention, other more specific objects and advantages will be evident upon an understanding of the construction of the improved seal.

A preferred embodiment of the invention is presented herein for the purpose of exemplification, but it will of course be appreciated that the invention is capable of being embodied in other structurally modified forms coming equally within the scope of the appended claims.

In the accompanying drawing:

Fig. 1 is a diametric section through an end-thrust seal constructed in accordance with the invention, showing the seal installed about a shaft between two relatively rotatable machine parts;

Fig. 2 is a face view of the rear end of the seal; and

Fig. 3 is a face view of the front end of the seal.

The improved seal is a self-contained unit which is adapted to be press-fitted into a bore 10 in a housing 11, about a shaft 12, in sealed association at its front end with the opposed face 13 of a member 14 on the shaft. The seal consists of an outer portion 15, an inner portion 16, a centrally apertured connecting disk 17 of synthetic rubber or other soft flexible imperforate material, and an expansion spring 18.

The outer portion 15 of the seal is of sheet metal construction and comprises a centrally apertured cup 19 and a tube 20. The tube 20 is telescoped within the cup 19, in engagement with the bottom of the latter, and is provided adjacent the rim of the cup with angularly inturned flange 21. The rim of the cup 19 is provided with an inturned flange 22 in opposition to the flange 21, and the outer edge of the diaphragm 17 is clamped securely between such flanges.

The inner portion 16 of the seal is for the most part of sheet metal construction and comprises an inner tube 23, an outer tube 24, and a sealing ring 25. The inner tube 23 is provided at its front end with an outwardly extending flange 26 which terminates in a short axially extending flange 27. The sealing ring 25, which may be of "Oilite," bronze, carbon or other suitable material, is press- fitted into the socket formed in the front end of the inner tube 23 by the outwardly and axially extending flanges 26 and 27. The outer tube 24 of the inner portion 16 is sleeved over the inner tube 23, in press-fit association with the latter, and is provided at its front end with an angularly outturned flange 28 in opposition to the flange 26. The inner edge of the diaphragm 17 is securely clamped between the flanges 26 and 28. The spring 18 encircles the inner portion 16 of the seal and is compressed between the inner portion of the bottom of the cup 19 and the flange 28.

The opening 29 in the bottom of the cup 19 is provided with a plurality of arcuate notches 30, and the rear end of the inner portion 16 is provided with a corresponding number of rearwardly extending arcuate sections 31 which project rearwardly through the notches 30, thereby providing a circumferential interlock between the inner and outer portions of the seal.

The seal is shown in Fig. 1 in its normal operating position, with the spring 18 pressing the sealing ring 25 against the face 13 of the member being sealed, and with the inner edge of the diaphragm 17 in substantially the same plane as the outer edge of the same. Before the seal is installed, or when the member being sealed is withdrawn from engagement with the sealing ring 25, the spring 18 will project the sealing ring 25 beyond the position shown, flexing the diaphragm 17 into the conical shape indicated in dotted lines at 32. Maximum compression of the seal is limited by engagement of the bottom of the cup 19 with the edges 33 and 34 of the tubes 23 and 24, with the diaphragm 17 flexed conically in the opposite direction, as indicated in dotted lines at 35.

I claim:

1. An end-thrust seal comprising an outer portion, an inner portion, a diaphragm connecting said portions, a spring for urging the inner portion axially with respect to the outer portion, and a sealing surface at the front end of the inner portion, said inner portion consisting of two sheet metal tubes which are fixedly telescoped together and are provided at their front ends with outturned flanges between which the inner edge of the diaphragm is clamped.

2. An end-thrust seal comprising an outer portion, an inner portion, a diaphragm connecting said portions, a spring for urging the inner portion axially with respect to the outer portion, and a sealing ring carried by the inner portion, said inner portion consisting of two sheet metal tubes which are fixedly telescoped together and are provided at their front ends with outturned flanges between which the inner edge of the diaphragm is clamped, and the outturned flange on the inner one of said tubes terminating in an axially extending flange in which the sealing ring is socketed.

3. An end-thrust seal comprising an outer portion, an inner portion, a diaphragm connecting said portions, a spring for urging the inner portion axially with respect to the outer portion, and a sealing ring carried by the inner portion, said outer portion including a centrally apertured sheet metal cup and a tube telescoped within the cup and seated against the bottom of the same, and said diaphragm being clamped at its outer periphery between inturned flanges on the rim of the cup and the adjacent end of the tube within the cup.

4. An end-thrust seal comprising an outer portion, an inner portion, a diaphragm connecting said portions, and a spring for urging the inner portion axially with respect to the outer portion, said outer portion including a centrally apertured cup, said inner portion including a tube which extends axially through the aperture in the bottom of the cup and terminates in a sealing surface in front of the diaphragm, and said spring being positioned in the cup behind the diaphragm and about the tube and being compressed between a flange on the tube and the bottom of the cup.

5. In a seal of the type adapted for insertion as a self-contained unit in a recess in a housing about a shaft, for end-thrust sealing coaction with a structurally independent annular shoulder fixedly associated with the shaft, a centrally apertured cup, a tube which is projectable axially with respect to the cup and is disposed within the cup with its front end extending forwardly beyond the rim of the cup and its rear end extending rearwardly through and beyond the aperture in the bottom of the cup, a spring within the cup about the tube for projecting the latter axially, means associated with and acting between the cup and the tube for limiting the extent to which the tube may be projected axially by the spring, and other means associated with and acting between the cup and the tube for preventing rotation of the tube with respect to the cup in all positions of the tube, said last mentioned means consisting of a plurality of inwardly extending arcuate formations about the inner edge of the aperture in the bottom of the cup and a plurality of axially extending slots in the tube, which slots interfit with the arcuate formations in all positions of the tube and interlock the tube circumferentially with respect to the cup.

6. In a seal of the type adapted for insertion as a self-contained unit in a recess in a housing about a shaft, for end-thrust sealing coaction with a structurally independent annular shoulder fixedly associated with the shaft, a centrally apertured cup, a tube which is projectable axially with respect to the cup and is disposed within the cup with its front end extending forwardly beyond the rim of the cup and its rear end extending rearwardly through and beyond the aperture in the bottom of the cup, a spring within the cup about the tube for projecting the latter axially, means associated with and acting between the cup and the tube for limiting the extent to which the tube may be projected axially by the spring, and other means associated with and acting between the cup and the tube for preventing rotation of the tube with respect to the cup in all positions of the tube, said first mentioned means consisting of a flexible diaphragm which in the farthest projected position of the tube holds the latter against further projection, and said second mentioned means consisting of a plurality of inwardly extending arcuate formations about the inner edge of the aperture in the bottom of the cup and a plurality of axially extending slots in the tube, which slots interfit with the arcuate formations in all positions of the tube and interlock the tube circumferentially with respect to the cup.

RUDOLPH J. VEDOVELL.